(No Model.)
W. ERVIN.
GAGE AND CLAMP FOR WEATHER BOARDING, &c.
No. 334,363. Patented Jan. 12, 1886.
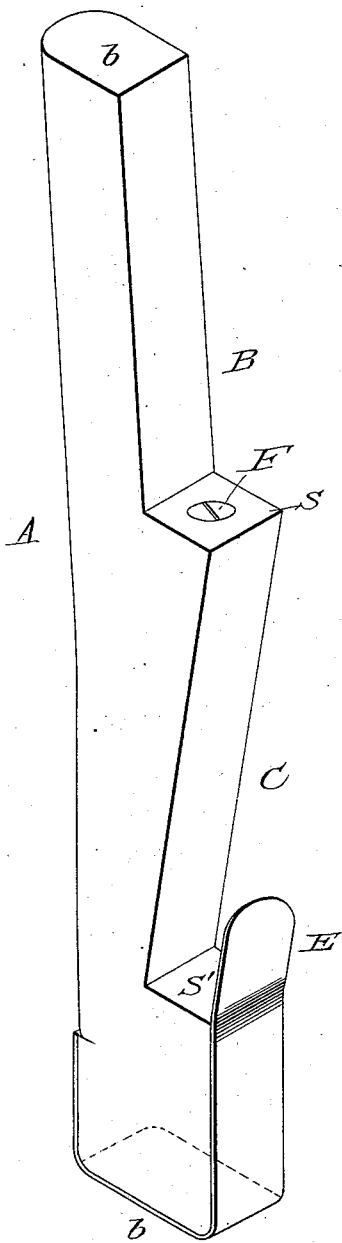
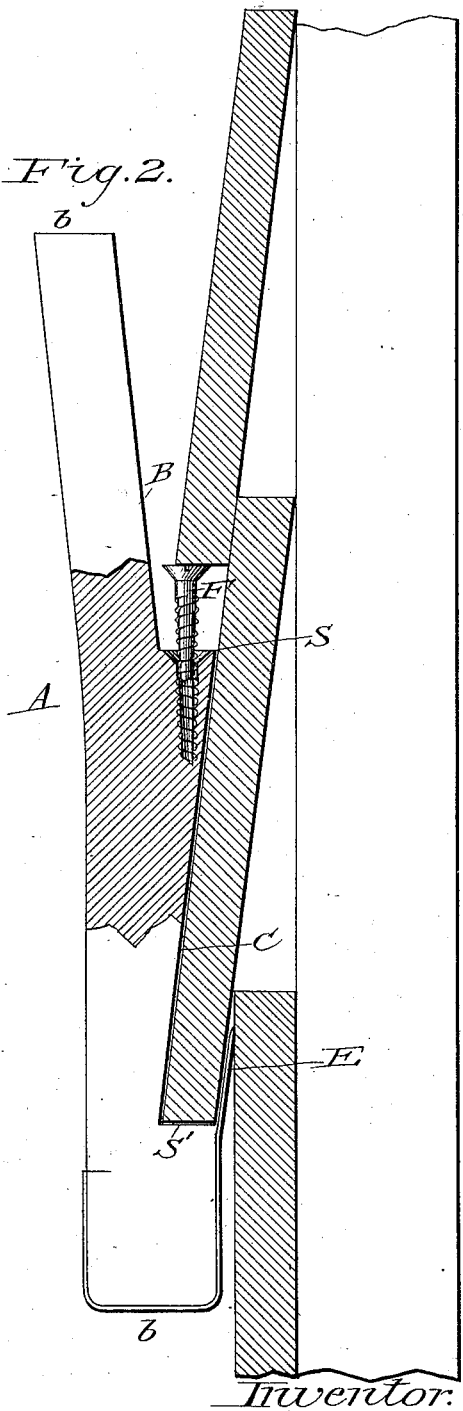

UNITED STATES PATENT OFFICE.

WILLIAM ERVIN, OF ARGENTINE, KANSAS.

GAGE AND CLAMP FOR WEATHERBOARDING, &c.

SPECIFICATION forming part of Letters Patent No. 334,363, dated January 12, 1886.

Application filed October 19, 1885. Serial No. 180,241. (No model.)

*To all whom it may concern:*

Be it known that I, WILLIAM ERVIN, a citizen of the United States, residing at Argentine, Wyandotte county, Kansas, have invented a new and useful Improvement in Gage and Clamp for Weatherboarding, &c., of which the following is a specification.

Heretofore clamps and gages of this class have been made in several parts, which in use are liable to become worn, the gages being adjustably connected to the clamps, and the clamps often provided with spurs or pins to prevent the clamp from slipping.

The object of my invention is to avoid this multiplicity of parts by a simpler construction, and to provide a cheaper and more durable article.

In the drawings, Figure 1 is a perspective view of my invention, and Fig. 2 a side elevation, partly in section, showing my invention in operative position.

A denotes the body of my gage and clamp, formed out of a single piece of wood or other suitable material, cut away to form shoulders or stops S S and faces B and C of the gage and clamp, the face C of the clamp being a little longer than the face B of the gage.

F is an adjustable screw, countersunk in the shoulder S.

E is a metal tongue or spring, rigidly fastened to the lower end of the body of the gage and clamp, the free end of which, after a slight deflection, runs about parallel with the face C. The upper and lower ends, *b b*, of the body A are flattened, as shown in Fig. 1.

In using my gage and clamp the metallic tongue or spring E is forced up under the board last nailed on, clamping it against the face C, and the purpose of the flattened ends *b b* is to allow the use of a hammer or carpenter's hatchet in forcing by blows upon said ends the tongue E in position or loosening its hold. The board to be nailed on next is properly gaged by adjusting the screw F. This screw works vertically, or nearly so, into a screw-thread formed in the shoulder or stop S.

I am aware that clamps and gages of this class have been made with the facings of the clamp and gage and the stops or rests formed out of a single piece of material, as shown in the patent of J. R. Kevett, of March 29, 1881, No. 239,390.

I am also aware that an adjustable screw has been used to work in the lower stop or rest to gage the width of the board, as shown in the patent of Mulhollins, of October 18, 1870, No. 108,377.

Having described my invention, what I claim, and desire to secure by Letters Patent, is—

A clamp and gage for weatherboarding, &c., having faces B and C, stops or rests *a a'*, and flattened ends *b b*, formed out of a single piece of wood or other material, provided with a suitable tongue or spring, E, the upper stop or rest, *a*, having an adjustable screw, F, working vertically therein, substantially as and for the purposes described.

WILLIAM ERVIN.

Witnesses:
CHAS. B. ADAMS,
G. W. BERG.